US008109146B2

(12) United States Patent
Young

(10) Patent No.: US 8,109,146 B2
(45) Date of Patent: Feb. 7, 2012

(54) MEASUREMENT OF BOWED STRING DYNAMICS

(75) Inventor: Diana Young, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 718 days.

(21) Appl. No.: 12/034,924

(22) Filed: Feb. 21, 2008

(65) Prior Publication Data

US 2009/0216483 A1 Aug. 27, 2009

(51) Int. Cl.
*G01P 3/04* (2006.01)

(52) U.S. Cl. ........................................ 73/510

(58) Field of Classification Search .................... 73/510, 73/511; 33/356
See application file for complete search history.

(56) References Cited

U.S. PATENT DOCUMENTS

| | | | | |
|---|---|---|---|---|
| 5,038,662 A * | 8/1991 | Ho | 84/723 |
| 5,286,911 A * | 2/1994 | Murata et al. | 84/615 |
| 2004/0065187 A1* | 4/2004 | Ludwig | 84/645 |
| 2007/0068372 A1* | 3/2007 | Masuda et al. | 84/723 |

FOREIGN PATENT DOCUMENTS

| | | |
|---|---|---|
| JP | 10078778 A * | 3/1998 |
| JP | 2008008924 A * | 1/2008 |

OTHER PUBLICATIONS

Diana Young et al., Bowstroke database: a wed-accessible archive of violin bowing data, Jun. 6, 2007, ACM New York, NY, New Interfaces for Musical Expression Proceedings of the 7th Internaltional Conference on New interfaces for musical expression, p. 352-353.*

Joseph A. Paradiso et al., Musical Applications of Electric Field Sensing, Computer Music Journal, 21(3):69-89, 1997.

Stefania Serafin et al., Gestural Control of Real-Time Physical Model of a Bowed String Instrument, in Proceedings of the International Computer Music Conference, ICMC, Oct. 1999.

Frédéric Bevilacqua et al., The Augmented Violin Project: Research, Composition and Performance Report, in Proceedings of the 2006 Conference on New Interfaces for Musical Expression (NIME-06), Paris, 2006.

Nicolas H. Rasamimanana et al., Gesture Analysis of Violin Bow Strokes, GW 2005, LANI 3881, pp. 145-155, 2006.

Jean-Loup Florens et al., Real-Time Bowed String Synthesis with Force Feedback Gesture Interaction. In Proceedings of the International Computer Music Conference, ICMC, 2001.

Dan Overholt, The Overtone Violin, in Proceedings of the 2005 Conference on New Interfaces for Musical Expression (NIME-05), Vancouver, 2005.

(Continued)

*Primary Examiner* — Hezron E Williams
*Assistant Examiner* — Tamiko D Bellamy
(74) *Attorney, Agent, or Firm* — SoCal IP Law Group LLP; John E. Gunther; Steven C. Sereboff

(57) ABSTRACT

There are disclosed systems and methods for measuring the bowing parameters and the bowed string dynamics of a player playing a bowed string instrument. A system for measuring the bowing parameters and the bowed string dynamics may comprise a computer, a bow system and a base component. The bow system may comprise a force sensing mechanism and a bow board. The bow board may comprise an acceleration and angular velocity sensing mechanism, a position and speed sensing mechanism, a data communication module, and a power module. The base component may comprise an acceleration and angular velocity sensing mechanism, a position and speed sensing mechanism, a data communication module, and a power module.

15 Claims, 4 Drawing Sheets

OTHER PUBLICATIONS

Stefania Serafin et al., Bowed String Physical Model Validation Through Use of a Bow Controller and Examination of Bow Strokes, in Proceedings of the Stockholm Music Acoustics Conference (SMAC 03), Stockholm, Aug. 2003.

Chris Chafe, Stimulating Performance on a Bowed Instrument, Technical Reports STAN-M-48, Center for Computer Research in Music and Acoustics (CCRMA), Department of Music, Stanford University, May 1988.

Charles Nichols, The vBow: Development of a Virtual Violin Bow Haptic Human-Computer Interface, Center for Computer Research in Music and Acoustics, Stanford University.

Diana Young, The Hyperbow: a Precision Violin Interface, in Proceedings of the ICMC, Goteborg, 2002, ICMC.

Diana Young, new Frontiers of Expression Through Real-Time Dynamics Measurement of Violin Bows, Master's Thesis, M.I.T., 2001.

Diana Young, The Hyperbow Controller: Real-Time Dynamics Measurement of Violin Performance, in Proceedings of the 2002 Conference on New Instruments for Musical Expression (NIME-02), Montreal, 2002.

Diana Young, Wireless Sensor System for Measurement of Violin Bowing Parameters, in Proceedings of the Stockholm Music Acoustics Conference (SMAC 03), Stockholm, Aug. 2003.

Diana Young et al., Playability Evaluation of a Virtual Bowed String Instrument, in Proceedings of the 2003 Conference on New Interfaces for Musical Expression (NIME-03), Montreal, 2003.

Adrian Freed et al., Augmenting the Cello, in Proceedings of the 2006 Conference on New Interfaces for Musical Expression (NIME-06), Paris, 2006.

* cited by examiner

MEASUREMENT OF BOWED STRING DYNAMICS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to a measurement system designed to understand the dynamics of a bowed string instrument.

2. Description of the Related Art

To understand the intricacies and nuances of a bowed string instrument, at least two aspects of a bowed string instrument may be analyzed. First, the physics of a bowed string instrument needs to be understood. Second, how a player controls and uses the bow of a bowed string instrument to produce a range of sound, with respect to the pitch and volume, needs to be understood.

Regarding the first aspect, extensive research and numerous studies have been performed in an attempt to understand the physics of a bowed string instrument. This aspect is complex because the way the bow and the string of the bowed string instrument interact affects the sound produced by the bowed string instrument. Certain bowing parameters affect the sound produced by the instrument. For example, the bow speed, the bow position, the bow tilt, and the bow force used on the string all affect the sound produced by the instrument.

One feature of a bowed string instrument is that a friction component exists inherent in the interaction between the bow and the string. Players of a bowed string instrument strive to achieve the “Helmholtz motion” between the bow and string interaction. (“Helmholtz motion” occurs when the string forms a corner that travels in a parabolic path back and forth between the bridge and nut of the violin.) In order to achieve the “Helmholtz motion”, the player needs to carefully manage the interaction between the bow speed and the bow force on the string. The bow speed, bow force and position determine how and if the bow sticks to the string. If the bow does not stick to the string, then the string will produce surface sound, which is not desired by the player. If the string does not release from the bow in a timely manner, then the string motion will sound harsh.

Achieving the “Helmholtz motion” not only requires skill but also an understanding of the physics of the bowed string instrument. A player also benefits by understanding the relationship between the bowing parameters and the sound produced. The friction component inherent in the bow and string interaction distinguishes the bowed string instrument from instruments that are not bowed string instruments. The friction component creates a “many-to-one” mapping in which numerous variations of bowing parameters can be used to achieve the same sound. Therefore, while a person may be able to predict the sound that will be produced after knowing the bowing parameters, a person will not be able to determine the bowing parameters based solely on hearing the sound produced.

The measurement system disclosed herein measures a player’s bowing technique where the system allows the instrument to be played normally, without interference, so as to capture realistic data. Systems exist that can analyze the sound from real violins generated by fixed bowing parameters and that can be used in a laboratory environment which can measure certain bowed string dynamics. However, without a system included with or coupled to a stringed instrument which allows the instrument to be played normally, without interference, the bowing parameters cannot be precisely and accurately measured.

Therefore, a measurement system has been created to capture gesture data and audio of a player playing a bowed string instrument, so as to understand the dynamics of a bowed string instrument. The gesture data captured is the data relating to how a player controls the bow. By capturing the gesture data and the corresponding audio produced by the bowed string instrument, the measurement system can aid in understanding the dynamics of a bowed string instrument such as how and why certain bowing gestures produce certain sounds from the instrument.

DETAILED DESCRIPTION

Throughout this description, the embodiments and examples shown should be considered as exemplars, rather than limitations on the systems and methods disclosed or claimed.

Understanding the techniques employed for bowing a stringed instrument is complex because both the bow and the base of the stringed instrument are moving while the player plays the instrument. (The “base” of the stringed instrument as used herein is the part of the instrument that comprises the strings.”) In addition, in some instances, the bow and the base may move in opposing directions. Therefore, the measurement system described herein detects the 3D movement of both the bow and the base of the stringed instrument. By detecting the movement of both the bow and the base, the measurement system can measure the bowing parameters relative to the violin or other stringed instrument. These bowing parameters include parameters such as the bow force, the bowing direction, the bow tilt, the bow-bridge distance, the bow position and the bow speed.

The bow force is the force with which the bow is applied to the string of the base. Knowing the force applied to the strings on the base is helpful in understanding bowing techniques because the amount of force used will affect the sound produced by the instrument.

The bowing direction is the direction the bow is moving—upward or downward—with respect to the base. Knowing the direction the bow is moving is another parameter which will aid in understanding bowing techniques.

The bow tilt is the tilt of the bow with respect to gravity or with respect to the violin. The bow-bridge distance is the distance of the bow from the bridge of the base. The bow position is the distance between the bow and the violin. The bow speed is the speed the bow is moved in a certain bowing direction on the base of the bowed string instrument. The bow speed may be influenced by the bow tilt. The above identified bowing parameters are essential to describe the dynamics of a bowed string instrument.

A Measurement System

Figure 1:
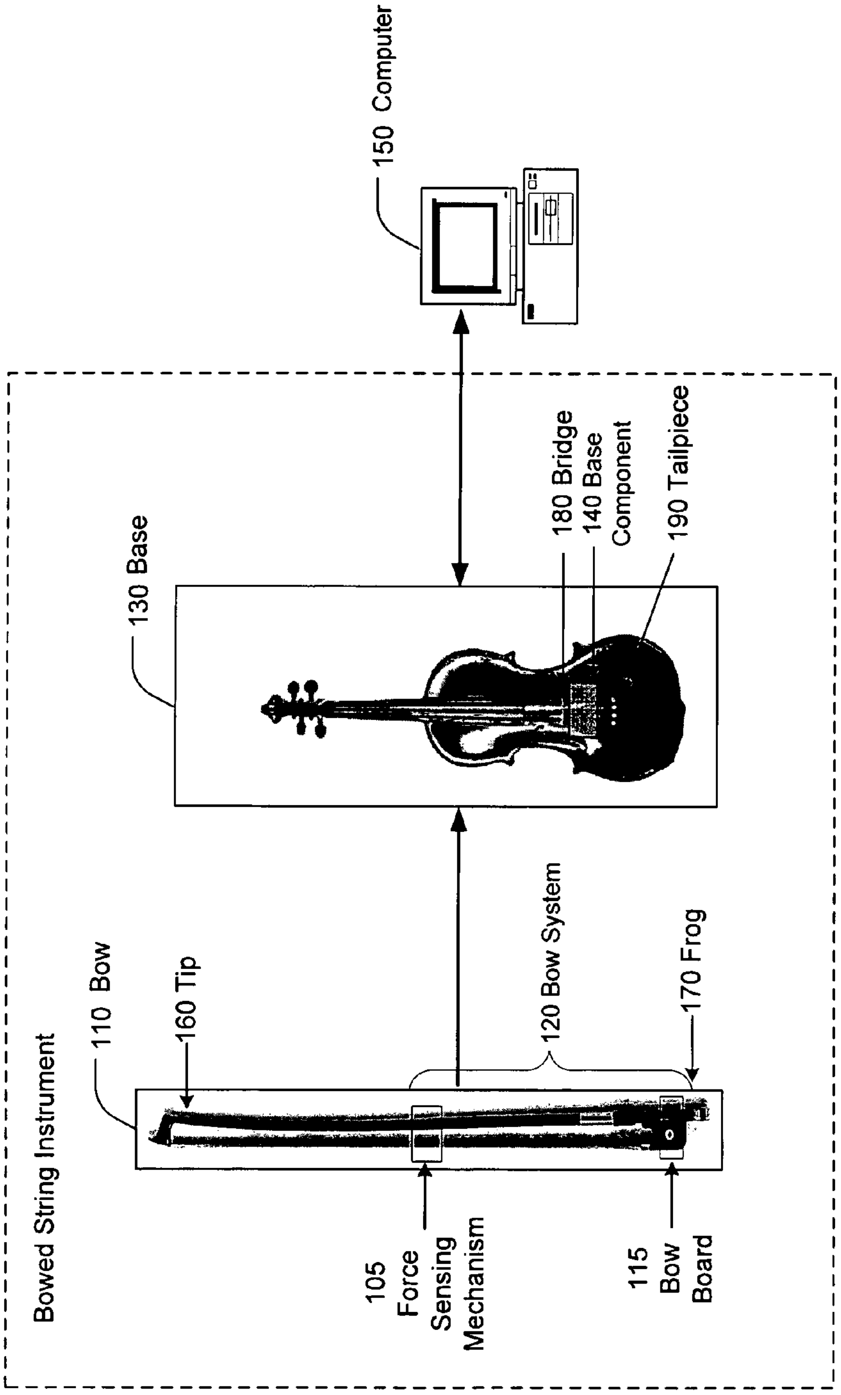
FIG. 1 is a physical diagram of a measurement system comprising a bow having a bow system coupled with a bowed string instrument and a computer.

Referring now to FIG. 1, there is shown a physical diagram of a measurement system comprising a bow system 120 and base component 140 coupled with a bowed string instrument and a computer 150. The measurement system captures the physical bow motion and bowing technique of a player playing a bowed string instrument. The measurement system does not impair traditional bowing techniques and therefore remains convenient to use and play by a performer. The measurement system may be implemented on a variety of bowed string instruments including a violin, a cello, a viola and a double bass.

The measurement system works in conjunction with a bow 110 and a base 130 of a bowed string instrument, and a computer 150. The bow 110 typically consists of a stick with at least four strands of horsehair strung between the two ends of the stick, the tip end 160 and frog end 170. The bow system 120 portion of the measurement system may reside on the bow 110 of the bowed string instrument. The bow system 120 may comprise a force sensing mechanism 105 and a bow board 115. In one embodiment, the force sensing mechanism 105 may be installed near the midpoint of the bow. In another embodiment, the force sensing mechanism 105 may be installed along the full length of the bow. In one embodiment, the bow board 115 may be installed near the frog 170 end of the bow 110. In another embodiment, the bow board 115 may be integrated into the bow itself. The force sensing mechanism 105 and bow board 115 are described in more detail below regarding FIG. 2.

The bow system 120 is generally a small and lightweight system which is free from unnecessary wires. The purpose of designing a small and lightweight system is to ensure that a player's movement of the bow remains unconstrained and that the bow remains comfortable to use.

The measurement system further comprises a base component 140 that resides on the base 130 of the bowed string instrument. The base component may reside between the bridge 180 and the tailpiece 190 of the base 130.

The measurement system also comprises a computer 150. Although shown implemented in a personal computer, the systems and methods may be implemented with any computing device. A computing device as used herein refers to any device with a processor, memory and a storage device that may execute instructions including, but not limited to, personal computers, server computers, computing tablets, set top boxes, cellular telephones, video game systems, personal video recorders, personal digital assistants (PDAs), portable computers, and laptop computers. These computing devices may run an operating system, including, for example, variations of the Linux, Unix, MS-DOS, Microsoft Windows, Palm OS, Solaris, Symbian, and Apple Mac OS X operating systems.

Figure 2:
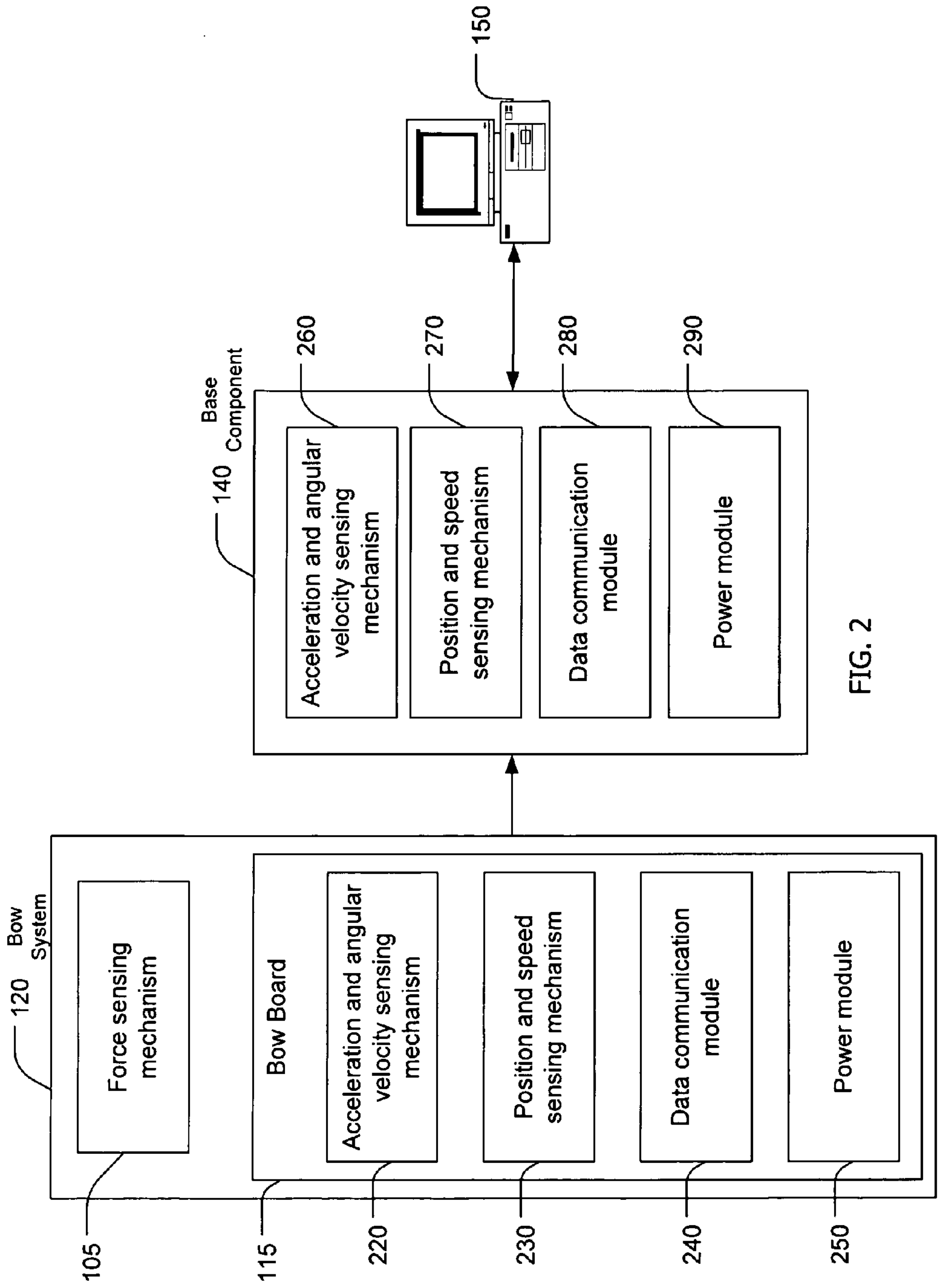
FIG. 2 is a block diagram of a measurement system comprising a bow system and base component that measure bowed string instrument dynamics.

Referring now to FIG. 2, there is shown a block diagram of a measurement system comprising a bow system and base component that measure bowed string instrument dynamics. The measurement system comprises a bow system 120 and a base component 140 coupled with a computer 150 (as shown in FIG. 1).

The bow system 120 comprises a force sensing mechanism 105, and a bow board 115. The bow board 115 comprises a board with circuitry to aid in capturing the data related to the bowing parameters. In one embodiment, the bow board comprises a printed circuit board. The bow board 115 comprises an acceleration and angular velocity sensing mechanism 220, a position and speed sensing mechanism 230, a data communication module 240 and a power module 250.

Figure 4:
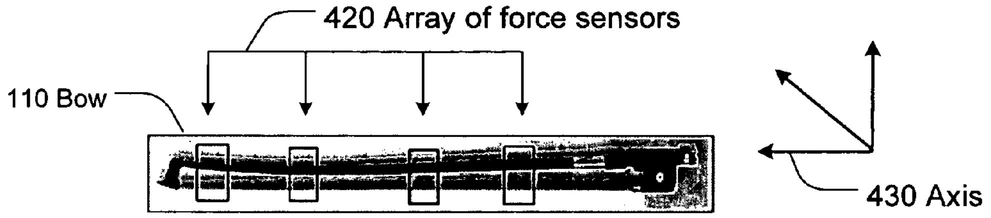
FIG. 4 is a physical diagram of a bow.

The force sensing mechanism 105 measures the bow force, including both the downward bow force and the lateral bow force. The force sensing mechanism 105 comprises two force sensors having a large bandwidth and minimal hysteresis. Force sensors with large bandwidth and minimal hysteresis are useful in ensuring that the rapid changes in bow force are accurately recorded. These force sensors are each composed of four foil strain gauges placed in a Wheatstone bridge configuration. A Wheatstone bridge is an electrical bridge circuit used to measure resistance. These force sensors may be placed around the midpoint of the bow. The force sensors may be installed by adhering the sensors and wiring the sensors to the stick of the bow. In another embodiment, the force sensing mechanism may comprise an array of force sensors placed along the length of the bow. For example, as seen in FIG. 4, an array of force sensors 420 can be placed along the bow 110. The axis 430 illustrates that the bow will be moving in three dimensions and the array of force sensors along the bow aid in measuring the downward and lateral bow force. In another embodiment, the force sensing mechanism may comprise quantum tunneling composites. In another embodiment, the force sensing mechanism may be impregnated into the bow.

The force sensing mechanism 105 may further comprise a digital to analog converter. The digital to analog converter maximizes the dynamic range of the force measurement by offsetting any imbalance of the Wheatstone bridge after installation.

The acceleration and angular velocity sensing mechanism 220 measures the bow direction and the bow tilt with respect to the violin. The bow tilt parameter is related to the area of the bow hair which is in contact with the string. In one embodiment, the acceleration and angular velocity sensing mechanism comprises a six degrees of freedom (6DOF) inertial measurement unit (IMU). The 6DOF IMU comprises three 3-axis accelerometers and three gyroscopes. The accelerometers can be piezoelectric accelerometers and MEMS accelerometers, or other 3-axis accelerometers. The gyroscopes can be piezoelectric vibrating gyroscopes, MEMS gyroscopes, or other gyroscopes capable of sensing an angular velocity of at least a maximum of ±300°/s. The acceleration measurements are calculated using the accelerometers, while the angular velocity measurements are calculated using the gyroscopes.

The position and speed sensing mechanism 230 measures the bow position and bow speed. In one embodiment, the position and speed sensing mechanism comprises a thin strip of resistive material that is attached to the length of the bow stick and extends from the tip 160 of the bow to the frog 170 of the bow. Material which can be used for the thin strip includes carbon-impregnated plastic, or any other material which has a resistance of approximately 20 kΩ. The tip end 160 and frog end 170 of the resistive strip transmit square wave signals which are received by an antenna mounted behind the bridge of the violin base. The corresponding magnitudes of the signals received may be used to measure the bow position and the bow speed.

In another embodiment, the position and speed sensing mechanism 230 comprises a resistive strip that does not extend the full length of the bow. Instead, the length of the resistive strip is slightly decreased such that it is further from the player's grasp, and the width of the resistive strip is increased at the frog end of the bow. In this embodiment, the attenuation of the signal is decreased because the player's hand is not as close to the resistive strip. In another embodiment, a time domain multiple access (TDMA) technique may be implemented to lower the power consumption of the position and speed sensing mechanism. In another embodiment, the position and speed sensing mechanism may comprise optical sensors. In another embodiment, the position and speed sensing mechanism may comprise magnetic sensors. In another embodiment, the position and sensing mechanism may comprise an array of force sensors spanning the length of the bow so as to measure the position.

The bow-bridge distance may be calculated using the following equation:

$$\Phi_1(x,y)+\Phi_2(x,y)=B_1/x+B_2,$$

where $\Phi_1$ is the potential from one end of the strip and $\Phi_2$ is the potential from the other end. In one embodiment, a camera may be implemented on the base component so as to measure the bow-bridge distance.

The bow position may be calculated from the magnitudes of the square wave signals received from the position and speed sensing mechanism 230 of the bow system 120 using the following steps.

First, the potential ($\phi$) in space (in the z=0 plane) is measured and the 2D relationship of the bow antenna and the base component antenna are given with the following equation:

$$\phi(x, y) = \left(A_1 \tanh^{-1}\sqrt{\frac{x^2}{x^2+a^2}} - A_2\right)(A_3 y - A_4)$$

where $\alpha$ is the width of the short dimension of the resistive strip.

Second, using the TDMA protocol, the potential of one end of the strip is raised to V, while the other end is grounded. Then, this step is reversed and repeated so that the signal is emitted from both the tip and the frog ends of the bow.

Third, the potential field in space is inverted by changing the sign on y, $$\phi(x, y) = \left(A_1 \tanh^{-1}\sqrt{\frac{x^2}{x^2+a^2}} - A_2\right)(A_3 y - A_4)$$

And $$\Phi_1(x,y)=\Phi_2(x,-y)$$

Then, the approximation for bow-bridge distance, x, is determined with the following formula:

$$\phi_1(x, y) + \phi_2(x, y) = -A_1 A_4 \coth\sqrt{\frac{x^2}{x^2+a^2}} + A_2 A_4.$$

as $x\to\infty$, $\Phi_1(x, y)=\Phi_2(x, y)\to 0$. Therefore, $A_2/A_1=\coth(1)\approx 1.3104$. If $$\alpha = \frac{\phi_1(x, y) + \phi_2(x, y)}{-A_1 A_4}$$

then x can be solved as:

$$x = \frac{i\sqrt{\operatorname{acoth}(\coth(1)+\alpha)}}{\sqrt{\frac{-1}{\alpha^2} + \frac{1}{\alpha^2}\operatorname{acoth}(\coth(1)+\alpha)}}.$$

Finally, in the last step, y can be solved with the following equations:

$$\phi_1(x, y) - \phi_2(x, y) = 2A_3 y\left(A_1 \coth\sqrt{\frac{x^2}{x^2+\alpha^2}} - A_2\right) \Rightarrow$$

$$y = \frac{\phi_1(x, y) - \phi_2(x, y)}{2A_3 A_1\left(\coth\sqrt{\frac{x^2}{x^2+\alpha^2}} - \coth(1)\right)}$$

and $$y = \frac{\phi_1(x, y) - \phi_2(x, y)}{-2A_3 A_4(\phi_1(x, y) + \phi_2(x, y))},$$

which is a linear function of $\Phi_{1,2}(x,y)$. This above equations provide an approximation, since the equations assume that the bow is always parallel to the bridge antennae and that the position estimates are calculated in a planar system where z=0.

The potential discussed above can be created using a 100 kHz square wave signal, or any other frequency signal that can allow coupling between the position and speed sensing mechanism 230 of the bow system 120 and the position and speed sensing mechanism 270 of the base component 140.

In one embodiment, the position and sensing mechanism 270 of the base component 140 may comprise a gain filter stage tuned to the frequency potential from the signals transmitted from the position and sensing mechanism 230 of the bow system 120. The position and sensing mechanism 270 may also comprise a peak detector in which a low pass filter of the peak detector includes a notch filter to handle in one embodiment, up to 60 Hz noise. In another embodiment, a digital notch filter may be used.

The data communication module 240 transmits the data captured by the various sensing mechanisms to the base component 140. In one embodiment, the data communication module 240 comprises a microcontroller. The microcontroller may include an eight-port 12-bit analog to digital converter. The microcontroller may also include a two-port digital to analog converter. The data communication module 240 may also comprise a wireless interface, such as a Bluetooth interface, to transmit the data to the base component 140. The data communication module 240 acquires the signals from the force sensors and the six inertial measurements (the 3D acceleration and the 3D angular velocity), and also generates two position signals. The method for transmitting the data to the base component 140 is described in FIG. 3 (below).

The power module 250 provides power to the bow system 120. In one embodiment, the power module 250 comprises a lithium polymer single cell rechargeable battery. The lithium polymer single cell rechargeable battery is an example of a lightweight and small battery. Use of a lightweight and small battery ensures that the bow system remains lightweight, thereby allowing a player to use the bow in an unrestricted and convenient manner. Such a bow system ensures that the physical bow movement data captured is a true sample of the bowed string dynamics. The power module may also comprise an integrated switching supply and charger circuit used to charge the battery in the power module 250. The power module may also comprise a charging connector consisting of two charging pads and a mechanical cutout designed to accommodate a mobile phone charging cable or connector, or a USB connector. The power module may also comprise an audio cable connected to the computer 150 to capture and store the sound produced by the bowed string instrument.

In one embodiment, the base component 140 comprises an acceleration and angular velocity mechanism 260, a position and speed sensing mechanism 270, a data communication module 280, and a power module 290. The base component 140 may consist of a printed circuit board having components for the acceleration and angular velocity mechanism 260, the position and speed sensing mechanism 270, the data communication module 280, and the power module 290.

The acceleration and angular velocity mechanism 260 of the base component is similar to the acceleration and angular velocity mechanism of the bow component. In one embodiment, the acceleration and angular velocity sensing mechanism comprises a six degrees of freedom (6DOF) inertial measurement unit (IMU). The 6DOF IMU may comprise one 3-axis accelerometer and three gyroscopes. The accelerometers can be piezoelectric accelerometers and MEMS accelerometers, or other 3-axis accelerometers. The gyroscopes can be piezoelectric vibrating gyroscopes and MEMS gyroscopes, or other gyroscopes.

The position and speed sensing mechanism 270 aids in measuring the bow position and the bow speed parameters. In one embodiment, the position and speed sensing mechanism 270 comprises one antenna that is mounted behind the bridge of the violin. This antenna receives the signals transmitted from the position and speed sensing mechanism 230 of the bow system 120. In another embodiment, the position and speed sensing mechanism 270 comprises four antennas to receive signals from each of the four violin strings. In another embodiment, the position and speed sensing mechanism comprises optical sensors.

The data communication module 280 of the base component 140 receives data from the bow system 120 and transmits the data to the computer 150. In one embodiment, the data communication module 280 comprises a microcontroller. The microcontroller may include an eight-port 10-bit analog to digital converter. The microcontroller may also include an interface, such as a USB, IEEE 1394 or Bluetooth interface, to interact with the computer 150. The data communication module 280 may also comprise a cable, such as a USB cable, to carry the audio signal produced by the bowed string instrument.

The power module 290 provides power to the base component 140. The power module 290 comprises an interface, such as a USB interface, that is connected to the computer 150. This interface which is connected to the computer 150 may power the base component 140.

The measurement system comprises a computer 150. The computer 150 may power the base component 140 and/or the bow system 120. The computer 150 may store and archive the data captured from the bow system and the base component.

The measurement system may be calibrated to interpret the data captured from the bow system and the base component in S.I. units. In addition, to obtain an accurate estimation of the bowing parameters, additional components may be implemented on the measurement system. In one embodiment, a real-time Kalman filter is implemented to obtain accurate and precise data regarding the bowing parameters. A Kalman filter is a recursive filter that estimates the state of a dynamic system from a series of incomplete and noisy measurements. The Kalman filter can be implemented using a software program, module or component. The Kalman filter may take as input the data received from the data communication module 280 of the base component 140. The Kalman filter may then output the filtered data to another software program, module or component where the filtered data reflects the bowing data having minimal error.

Description of Methods

Figure 3:
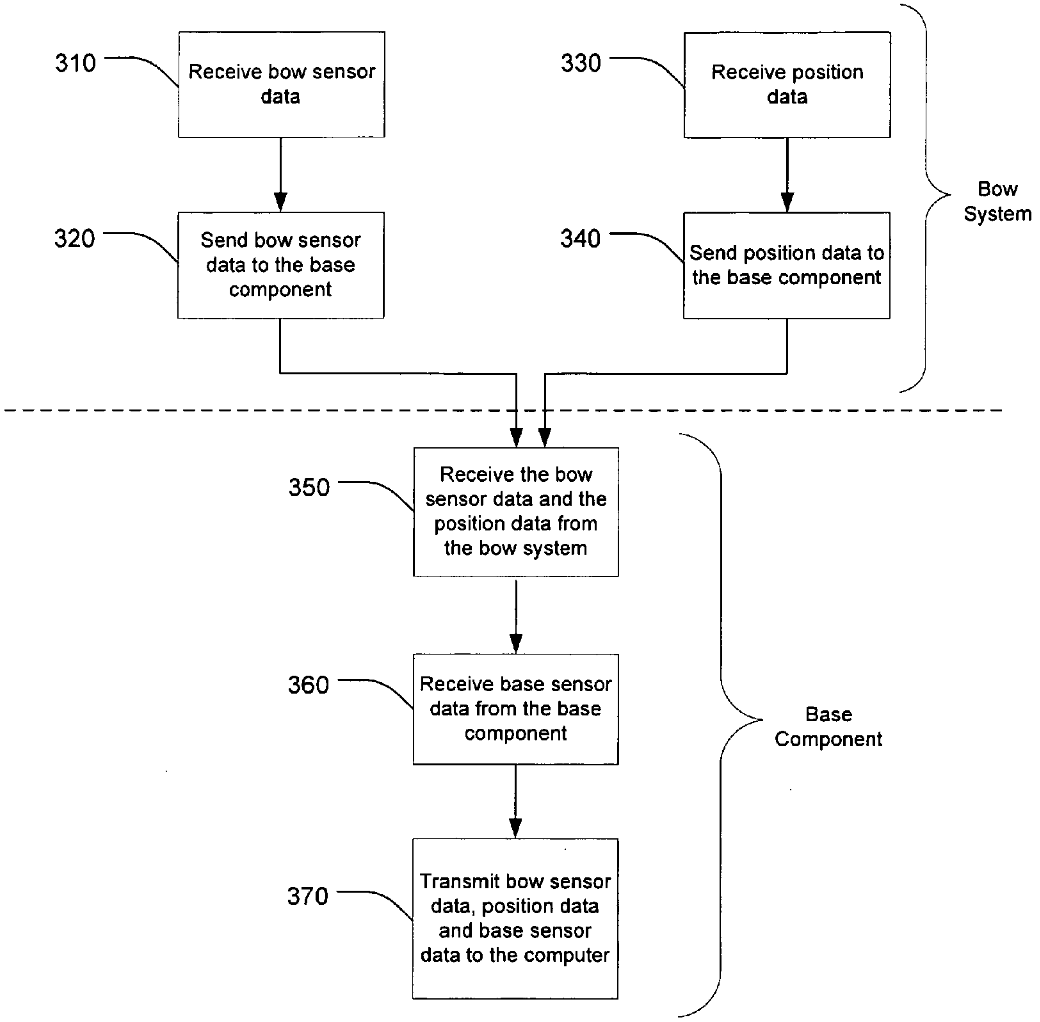
FIG. 3 is a flow chart of a method of measuring bowed string instrument dynamics.

Referring now to FIG. 3 there is shown a flow chart of a method of measuring bowed string dynamics.

In 310, the bow system 120 receives bow sensor data. The bow sensor data comprises data from the force sensing mechanism 210 and the acceleration and angular velocity sensing mechanism 220 of the bow system 120. In one embodiment, the data communication module 240 receives the bow sensor data via an analog to digital converter. In another embodiment, the sensor data is sent via PWM or a digital serial interface such as I2C or SPI.

In 320, the bow sensor data is sent to the base component 140. In one embodiment, the bow sensor data is sent via a Bluetooth module that exists as part of the data communication module 240 of the bow system 120. The bow sensor data can also be sent using UHF or a Microwave radio system.

In 330, the bow system 120 creates position data. The position data comprises data from the position and speed sensing mechanism 230 of the bow system 120. The position data includes information regarding whether the position signals from the tip end 160 and frog end 170 of the bow 110 are on or off. The position data also includes information regarding the measurements of the position signals from the tip end 160 and frog end 170 of the bow 110.

In 340, the position markers are sent via Bluetooth, and the position data is sent via the low frequency electric field radio to the base component 140. In one embodiment, the position data is sent via a Bluetooth module that exists as part of the data communication module 240 of the bow system 120. In another embodiment, the position data could be sent over the radio.

In 350, the base component 140 receives the bow sensor data and the position data. The bow sensor data is received by the data communication module 280 of the base component 140. The position data that the base component 140 receives may be multiplexed. If the position data is multiplexed, the base component may de-multiplex the data at this stage.

In 360, the base component 140 receives the base sensor data. The base sensor data comprises data from the acceleration and angular velocity sensing mechanism 260 of the base component 140. In one embodiment, the data communication module 280 may receive the base sensor data via an analog to digital converter.

In 370, the base component 140 combines the base sensor data with the bow sensor data and the position data. The base component 140 then outputs all of this data (the base sensor data, the bow sensor data and the position data) to the computer 150. The computer may also receive audio data relating to the sound produced by the bowed string instrument.

Once the computer 150 has received all of the data, the computer 150 may store and archive this data. The computer 150 may store and archive this data in a variety of ways.

In one embodiment, the data—both the bowing parameter data and the audio data—may be stored and archived in a database. The database may be accessible by a network such as, for example, the Internet. The database may be searchable based on keywords or filenames. The database may also include features such as implementing a stroke group. A stroke group is one way of classifying the bowing parameter data and the audio data. The stroke group may correspond to a certain bow stroke recording that includes the bowing parameter data and the audio data for a certain bow stroke. The stroke group may include all files related to the original player's recording. The database may also allow multiple files to be uploaded at the same time. For example, the database may allow up to ten files, or any number of files, to be uploaded at once. The database may allow a user to control the files he or she uploads. For example, a user may wish to control who has permission to access his or her files. In addition, the user may wish to categorize the files he or she updates. The database allows for storing, archiving and retrieving data captured by the measurement system.

Closing Comments

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

Additional and fewer units, modules or other arrangement of software, hardware and data structures may be used to achieve the systems and methods described herein.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

As used in the claims, the terms "comprising", "including", "carrying", "having", "containing", "involving", and the like are to be understood to be open-ended with respect to each limitation of the claim.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A system for measuring bowed string dynamics comprising
- a stringed instrument comprising a bow and a base
- a bow acceleration and angular velocity sensor for sensing movements of the bow
- a base acceleration and angular velocity sensor for sensing movements of the base.

2. The system of claim 1 wherein
- each of the bow acceleration and angular velocity sensor and the base acceleration and angular velocity sensor comprises a six degrees of freedom inertial measurement unit.

3. The system of claim 2 wherein
- the bow acceleration and angular velocity sensor comprises one 3-axis accelerometer and three gyroscopes coupled to the bow.

4. The system of claim 3 wherein
- the base acceleration and angular velocity sensor comprises one 3-axis accelerometer and three gyroscopes coupled to the base.

5. The system of claim 3 wherein
- the bow includes a bow board
- the 3-axis accelerometer and the three gyroscopes are disposed on the bow board.

6. The system of claim 1 further comprising
- a force sensor for sensing forces with which the bow is applied to the base.

7. The system of claim 6 wherein
- the force sensor comprises at least one foil strain gauge.

8. The system of claim 1 further comprising
- a position and speed sensor for sensing position of the bow with respect to the base and speed of the bow with respect to the base.

9. The system of claim 8 wherein
- the position and speed sensor comprises at least one of
  - one or more optical sensors;
  - an electric field bow position sensor; and
  - an antenna placed on a bridge of the base.

10. The system of claim 9 wherein
- the electric field bow position sensor comprises a strip of resistive material that extends from a frog of the bow to a tip of the bow.

11. A method for measuring bowed string dynamics comprising
- measuring acceleration and angular velocity of a base of a stringed instrument
- measuring acceleration and angular velocity of a bow applied to the base
- determining bowing parameters relative to the base based on measurement results
- wherein the acceleration and angular velocity of the bow and the base are measured based on six degrees of freedom.

12. The method of claim 11 further comprising
- measuring a force with which the bow is applied to the base.

13. The method of claim 12 wherein the force measured comprises a downward bow force and a lateral bow force.

14. The method of claim 11 further comprising
- measuring a position of the bow with respect to the base.

15. The method of claim 11 further comprising
- measuring a speed with which the bow is applied to the base.

* * * * *